(12) United States Patent
Cuddihy et al.

(10) Patent No.: US 9,446,726 B2
(45) Date of Patent: Sep. 20, 2016

(54) VEHICLE BRAKING DEPLOYMENT LOGIC FOR PEDESTRIAN PROTECTION LEG STIFFENER

(71) Applicant: Ford Global Technologies, LLC, Dearborn, MI (US)

(72) Inventors: Mark A. Cuddihy, New Boston, MI (US); Iskander Farooq, Novi, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/745,838

(22) Filed: Jun. 22, 2015

(65) Prior Publication Data

US 2015/0283967 A1 Oct. 8, 2015

Related U.S. Application Data

(63) Continuation of application No. 14/179,695, filed on Feb. 13, 2014, now Pat. No. 9,102,290.

(51) Int. Cl.
| *B60R 19/40* | (2006.01) |
| *B60R 21/34* | (2011.01) |
| *B60R 19/02* | (2006.01) |
| *B60R 21/013* | (2006.01) |

(52) U.S. Cl.
CPC ............. *B60R 19/40* (2013.01); *B60R 19/023* (2013.01); *B60R 21/34* (2013.01); *B60R 2021/01311* (2013.01)

(58) Field of Classification Search
CPC ....... B60R 19/40; B60R 19/56; B60R 21/34; B60R 21/013; B60R 2021/003; B60R 2021/0051; B60R 2021/0053; B60R 2021/01204; B60R 2021/01252; B60R 2021/01311; B60R 2021/343; B60R 2021/346; B60R 2021/3463
USPC ........... 296/187.04, 187.09; 293/118; 701/45
See application file for complete search history.

(56) References Cited

U.S. PATENT DOCUMENTS

| 3,992,047 | A | 11/1976 | Barenyi et al. |
| 4,582,351 | A | 4/1986 | Edwards |
| 6,089,628 | A | 7/2000 | Schuster |
| 6,394,512 | B1 | 5/2002 | Schuster et al. |
| 6,726,260 | B1 | 4/2004 | Wang et al. |
| 6,773,044 | B2 | 8/2004 | Schambre et al. |
| 7,192,079 | B2 | 3/2007 | Schramm et al. |
| 7,757,804 | B1 | 7/2010 | Li |

(Continued)

FOREIGN PATENT DOCUMENTS

| FR | 2864811 A1 | 7/2005 |
| GB | 2069940 A | 9/1981 |

(Continued)

OTHER PUBLICATIONS

Schuster, Peter J., Current Trends in Bumper Design for Pedestrian Impact, Paper No. 2006-01-0464, SAE International, Copyright 2006.

*Primary Examiner* — Gregory Blankenship
(74) *Attorney, Agent, or Firm* — Frank A. MacKenzie; Brooks Kushman P.C.

(57) ABSTRACT

A method and apparatus for controlling a deployable pedestrian protection leg stiffener of a motor vehicle based upon the vehicle braking status and longitudinal acceleration.

13 Claims, 4 Drawing Sheets

(56) References Cited

U.S. PATENT DOCUMENTS

| | | |
|---|---|---|
| 8,113,555 B2 | 2/2012 | Faruque |
| 8,950,800 B1 | 2/2015 | Farooq et al. |
| 9,102,290 B1 * | 8/2015 | Cuddihy .............. B60R 19/023 |
| 2006/0186702 A1 | 8/2006 | Kisanuki et al. |
| 2009/0242308 A1 | 10/2009 | Kitte et al. |
| 2010/0063676 A1 | 3/2010 | Ito |
| 2010/0116580 A1 | 5/2010 | Choi |
| 2014/0172234 A1 | 6/2014 | Headley et al. |
| 2014/0297171 A1 | 10/2014 | Minemura et al. |

FOREIGN PATENT DOCUMENTS

| | | |
|---|---|---|
| GB | 2321624 A | 8/1998 |
| JP | 2004074972 A | 3/2004 |

* cited by examiner

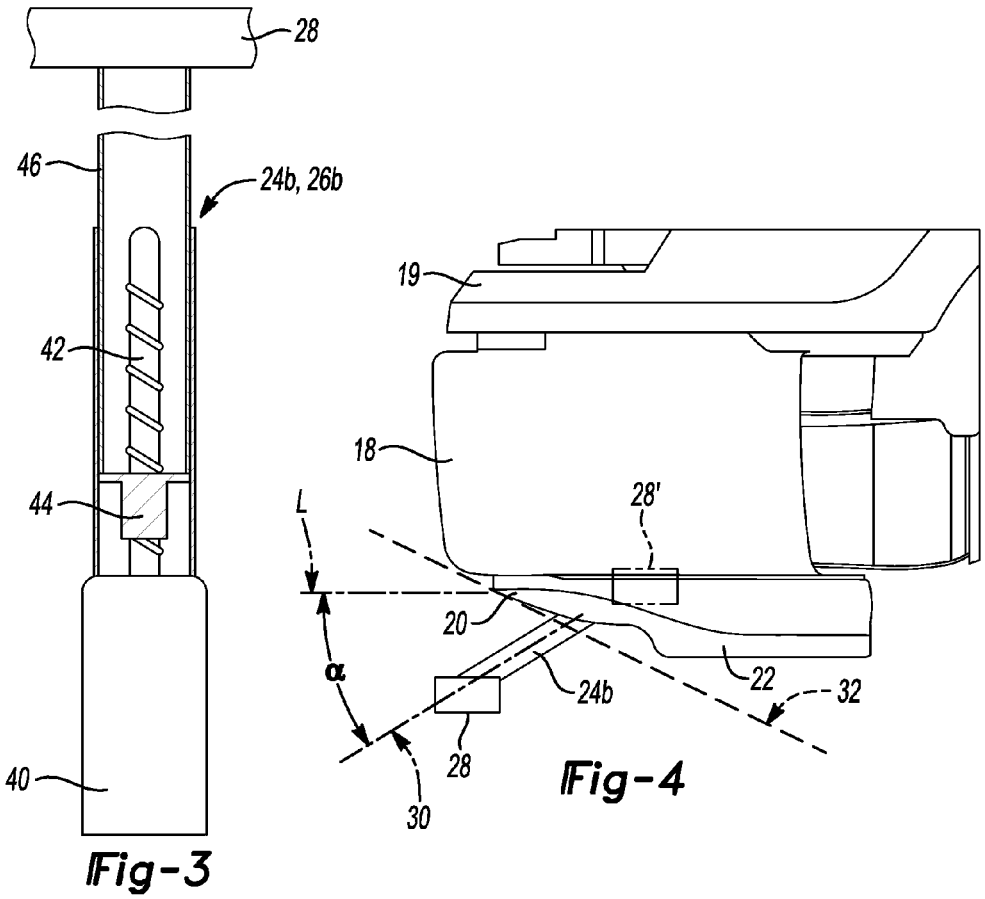
Fig-3
Fig-4
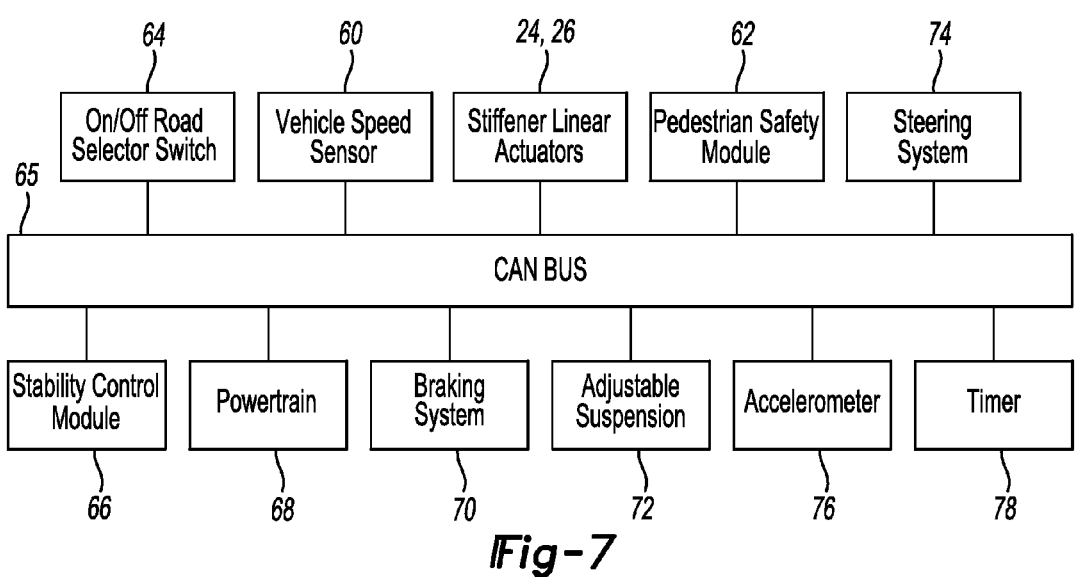
Fig-7

VEHICLE BRAKING DEPLOYMENT LOGIC FOR PEDESTRIAN PROTECTION LEG STIFFENER

CROSS-REFERENCE TO RELATED APPLICATIONS

This application is a continuation of U.S. application Ser. No. 14/179,695, filed Feb. 13, 2014, and issued as U.S. Pat. No. 9,102,290, the disclosure of which is incorporated in its entirety by reference herein.

TECHNICAL FIELD

The present invention relates generally to a deployable pedestrian protection stiffener for a motor vehicle, and more specifically to deployment logic that considers vehicle braking, longitudinal acceleration, speed.

BACKGROUND

Most current motor vehicles include a front bumper system intended to resist and/or absorb impact loads in the event of a collision. Typically, the bumper system includes a rigid bumper beam extending transversely relative to the vehicle and having sufficient strength to resist a required level of impact energy. The bumper beam is mounted to and supported by the vehicle frame, sub-frame, and/or body structure. In some cases, the bumper beam is mounted to the forward ends of a pair of frame rails which extend longitudinally relative to the vehicle and are spaced apart transversely. Often, the forward-most portion of the forward frame, immediately behind the bumper beam, comprises crush cans which are engineered to deform or collapse longitudinally in a manner to absorb impact energy in a predictable manner. The bumper system may also include numerous other bumper members and/or trim members connected to the bumper beam and/or the forward frame members. Bumper systems may also include one or more fascia components exposed over and covering the bumper.

Several current national and multi-national vehicle safety regulatory bodies have formulated pedestrian safety standards which new vehicles will be measured against. At least one such pedestrian safety test attempts to measure or estimate the degree of injury that will be inflicted on the lower leg of standing or walking pedestrian if struck by a relatively slow-moving vehicle. These tests generally indicate that a greater vertical distance between the bumper and the road surface may result in greater injury to the pedestrian's lower leg, because the lower leg may slide underneath the bumper.

Simply lowering the height of the bumper in order to improve performance in such a test may not be a practical solution because of the resulting reduction in vehicle ground clearance. Having a relatively large ground clearance is particularly important for vehicles that must operate off of paved surfaces.

It is known to provide a so-called lower leg stiffener below the bumper which is intended to prevent the bumper from over-riding the pedestrian's lower leg, and therefore reduce the likelihood and/or the severity of injury during a pedestrian impact. If the stiffener is fixed it may be damaged if it strikes an obstacle in the vehicle's path.

SUMMARY

In a disclosed embodiment of a method for controlling operation of a deployable pedestrian protection stiffener of a motor vehicle, the stiffener is retracted from a deployed position if a vehicle brake is applied and a longitudinal acceleration of the vehicle simultaneously exceeds a limit acceleration.

In a further disclosed embodiment of the method, the stiffener is retracted from the deployed position if a measured steering angle of the vehicle exceeds a limit angle.

In a further disclosed embodiment of the method, the stiffener is retracted from the deployed position if a measured speed of the vehicle drops below a lower limit.

In a further disclosed embodiment of the method, the stiffener is retracted only if the measured speed of the vehicle drops below the lower limit for longer than a predetermined length of time.

In a further disclosed embodiment of the method, the stiffener has a retracted position rearward of a forward surface of a vehicle bumper beam and above a ground clearance plane of the vehicle, and in the deployed position the stiffener is forward of the retracted position and below the ground clearance plane.

In a further disclosed embodiment of the method, a method for controlling a deployable pedestrian protection stiffener of a motor vehicle comprises deploying the stiffener if a vehicle speed exceeds a first value. The stiffener is subsequently retracted from the deployed position if any of the following conditions occur: 1) The vehicle speed drops below a second value; 2) A vehicle brake is applied; and 3) a longitudinal vehicle acceleration simultaneously exceeds a limit acceleration.

In a further disclosed embodiment of the method, the first value is equal to the second value.

In a further disclosed embodiment of the method, the stiffener is also retracted if the vehicle speed rises above a third value greater than the first value.

In another disclosed embodiment, pedestrian protection leg stiffener apparatus comprises a pedestrian leg stiffener movably mounted to a motor vehicle, an actuator moving the stiffener between a retracted position and a deployed position; and a controller directing the actuator. The controller receives an input from a braking system of the vehicle and an accelerometer and directs the actuator to position the stiffener in the retracted position if the braking system input indicates that a vehicle brake is applied and the accelerometer input simultaneously indicates that the vehicle is experiencing a longitudinal acceleration above a limit acceleration.

In a further disclosed embodiment of the apparatus, the controller further receives inputs from a steering system of the vehicle and directs the actuator to position the stiffener in the retracted position if the steering system input indicates a steering angle exceeding a limit angle.

In a further disclosed embodiment of the apparatus, the controller further receives an input from a vehicle speed sensor and directs the actuator to position the stiffener in the retracted position if the speed sensor input indicates that a vehicle speed is below a lower limit.

In a further disclosed embodiment of the apparatus, the controller directs the actuator to position the stiffener in the retracted position only if the vehicle speed is below the lower limit for longer than a predetermined length of time.

In a further disclosed embodiment of the apparatus, the controller further receives an input from a vehicle speed sensor and directs the actuator to position the stiffener in the deployed position if the speed sensor input indicates that a vehicle speed exceeds an upper limit.

In a further disclosed embodiment of the apparatus, stiffener when in the retracted position is rearward of a forward surface of a vehicle bumper beam and above a ground clearance plane of the vehicle, and in the deployed position the stiffener is forward of the retracted position and below the ground clearance plane.

BRIEF DESCRIPTION OF THE DRAWINGS

FIG. 3 is a schematic view of a linear actuator for deploying a pedestrian protection leg stiffener;

FIG. 4 is a schematic side view of showing a pedestrian protection leg stiffener in a deployed position;

FIG. 7 is a system block diagram of a control system to control the stiffener position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
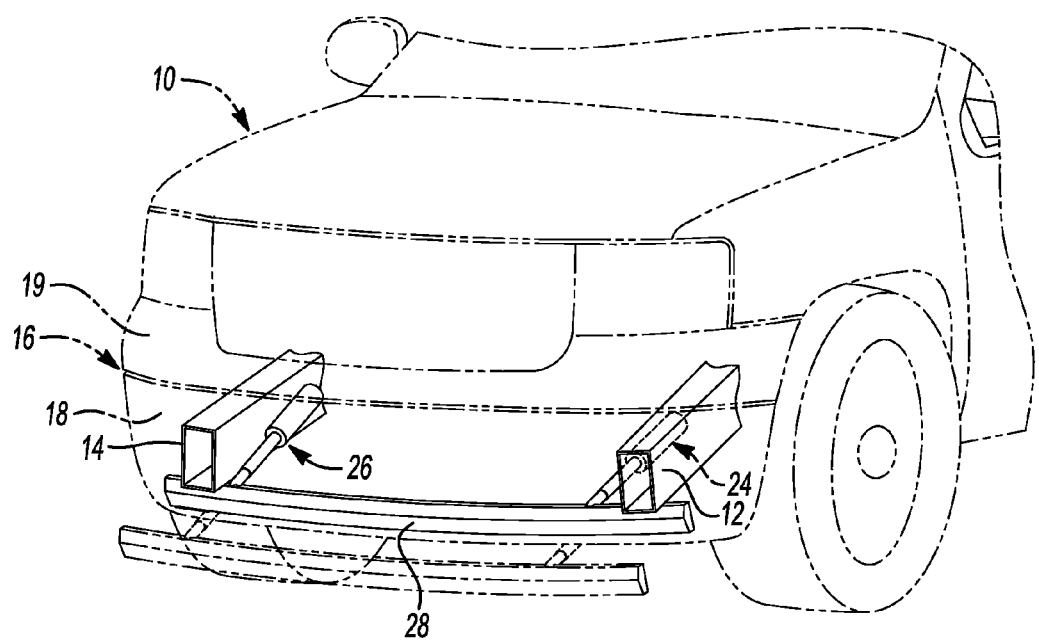
FIG. 1 is a schematic perspective view of a vehicle equipped with a pedestrian protection leg stiffener.
Figure 2:
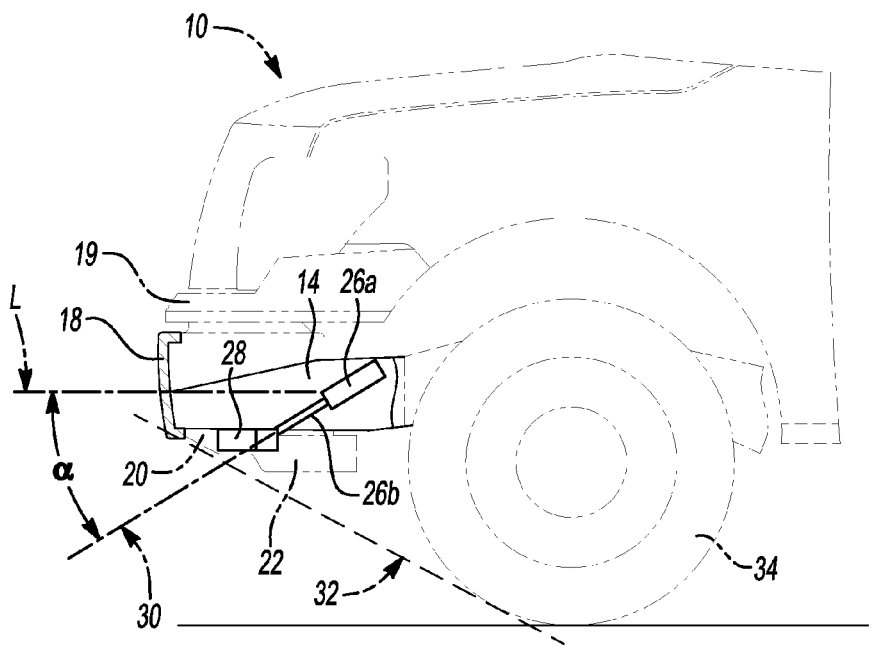
FIG. 2 is a schematic side view of the vehicle and pedestrian protection leg stiffener of FIG. 1.

Referring to FIGS. 1 and 2, a motor vehicle 10 generally comprises a left and a right forward frame member 12, 14 oriented approximately longitudinally relative to the vehicle. Forward frame members 12, 14 may be portions of a traditional ladder-type frame, of a forward vehicle sub-frame, of a unitary body/frame ("unit-body") construction, or of any known motor vehicle structure. Forward frame members 12, 14 may comprise crush cans.

A bumper assembly 16 extends generally transversely relative to the vehicle and is mounted to the left and right forward frame members 12, 14 in a conventionally known manner. Bumper assembly 16 generally comprises a rigid, high strength bumper beam 18 that is typically formed from steel, aluminum alloy, or a high-strength composite material. As is well known in the art, bumper beam 18 is a structural member designed to withstand impact loads during a collision and to transfer such loads to the forward frame member 12, 14. If the forward frame member 12, 14 comprise crush cans, an impact of sufficiently high impulse will result in the forward frame members yielding or deforming to absorb kinetic energy of the impact.

Referring to FIG. 2, Bumper assembly 16 may further comprise one or more other components such as an upper valence 19, a lower valence 20 attached to a lower portion of the bumper beam 18 and/or an air dam 22 which may be formed integrally with the lower valence.

Left and right linear actuators 24, 26 are mounted adjacent to the inboard surfaces of forward frame members 12, 14, respectively. As best seen in FIG. 2, right linear actuator 26 generally comprises a fixed portion 26a secured to forward frame member 14 and a movable piston 26b. Right linear actuator 26 is mounted to right frame member 14 so that piston 26b is linearly extendable along a deployment axis 30 that is oriented downward and forward at an angle α relative to a line L parallel with the longitudinal axis of the vehicle. Left linear actuator 24 similarly comprises a fixed portion secured to left forward frame member 12 and a movable piston extendable along a deployment axis at angle α relative to the vehicle longitudinal axis.

A lower leg stiffener 28 is mounted to the forward or distal ends of the pistons 24b, 26b and is moveable between a retracted position and an extended or deployed position (indicated in phantom lines in FIG. 1) by extension of the linear actuators 24, 26. Stiffener 28 may be made of any appropriate material, such as steel, aluminum or carbon fiber composites or plastics. For example, computer-aided engineering (CAE) simulations have been carried out in which the stiffener was modeled as a 50 mm×50 mm tube cross-section with wall thickness of 1.6 mm, formed of 6111 aluminum alloy.

As best seen in FIG. 2, when in the retracted position stiffener 28 is located immediately below the forward frame members 12, 14 and rearward of the forward surface of bumper beam 18. In the retracted position, stiffener 28 is preferably located above a ground clearance plane 32. Ground clearance plane 32, as is well known in the art, is an imaginary plane normally established by drawing a straight line from a point tangent to the front tire 34 to a lowest portion of the bumper assembly 16 or any other component extending downward and/or forward from the bumper beam. Thus, ground clearance plane 32 is the inclined plane below which no portion of the vehicle structure extends. The ground clearance plane for most vehicles sold in standard-use markets usually provides for a minimum height of running clearance and minimum degrees of ramp break-over angle or approach angle clearance in front of the front tires. Because stiffener 28 is located completely above the ground clearance plane 32 when retracted, it is protected from being struck by obstacles and it does not reduce the vehicle's ground clearance.

FIG. 4 shows the actuator 24 and lower leg stiffener 28 in the deployed or extended position. Actuator 26 is not visible in this side view, but is also in an extended state. In the deployed position, the linear actuators 24, 26 have been actuated to extend pistons 26a, 26b downward and forward so that the stiffener 28 is below the bumper beam 18 and below the ground clearance plane 32. When stiffener 28 is in the deployed position, it prevents or inhibits a lower leg (not shown) of a pedestrian from becoming trapped beneath the bumper assembly of a vehicle when the vehicle strikes the pedestrian. The value of angle α at which deployment axes 30 are oriented relative to horizontal and the vertical position of the stiffener 28 between the ground surface and the bumper assembly 16 may be determined by the geometry of the particular motor vehicle type and the pedestrian protection targets that the system is in intended to meet.

FIG. 4 also shows the position of the stiffener when in the retracted position, shown in hidden line and indicated by 28'. The retracted stiffener 28' may be partially enclosed and/or hidden from view by the lower valance 20 or other component(s) of bumper assembly 16. Alternatively, the retracted stiffener 28' may lie against and/or fit into a recess in the lower structure of the bumper assembly (in valence 20, for example) to present an aerodynamic shape.

Linear actuators 24, 26 may be electrically, pneumatically, or hydraulically powered. FIG. 3 is a simplified schematic diagram of one possible embodiment employing a rotary screw-type linear actuator in which a reversible electric motor 40 rotates a screw 42. A nut 44 engages the threads of screw 42 and is fixed relative to a piston shaft 46. Accordingly, rotation of screw 42 by motor 40 results in nut 44 and the attached piston 46 being extended or retracted depending on the direction of motor rotation.

In recognition of data collected relating to real-world pedestrian/vehicle collisions, pedestrian protection standards related to lower leg injury generally only address vehicle operation at relatively low speeds. For example, some standards may call for a vehicle to meet lower leg injury targets only in a speed range of from approximately 30 kph (kilometers per hour) to approximately 80 kph. Accordingly, the stiffener may be deployed only when the vehicle is operating in this speed range. Below 30 kph the stiffener is maintained in the retracted position where it is protected from damage. If the vehicle driver sees an obstacle that must be driven over and requires maximum ground clearance, he/she can slow to below 30 kph and the stiffener will be retracted. Above 80 kph, the stiffener is also retracted to reduce aerodynamic drag and so improve energy efficiency.

In addition, some vehicles may be operable in an Off-Road mode in which certain vehicle systems (suspension and/or powertrain, for example) have settings adapted for operation on un-paved, rough surfaces and, usually, at lower speeds. Such an Off-Road mode may be selected manually by the vehicle operator (if such a switch is provided for the operator) and/or may be triggered automatically based on certain detected parameters. When the vehicle is operating in an Off-road Mode, it is expected that it will be traveling in an area in which pedestrians are not likely to be present, and it is assumed that the vehicle will require the largest possible ground-clearance to avoid striking obstacles. Therefore, in the Off-Road mode, deployment of the stiffener is inhibited regardless of the vehicle speed.

Even when the vehicle is travelling at speeds within the "stiffener deployed" range (and the Off-Road mode is not selected), there are circumstances under which it may be favorable for the stiffener to be in the retracted position.

Figure 5:
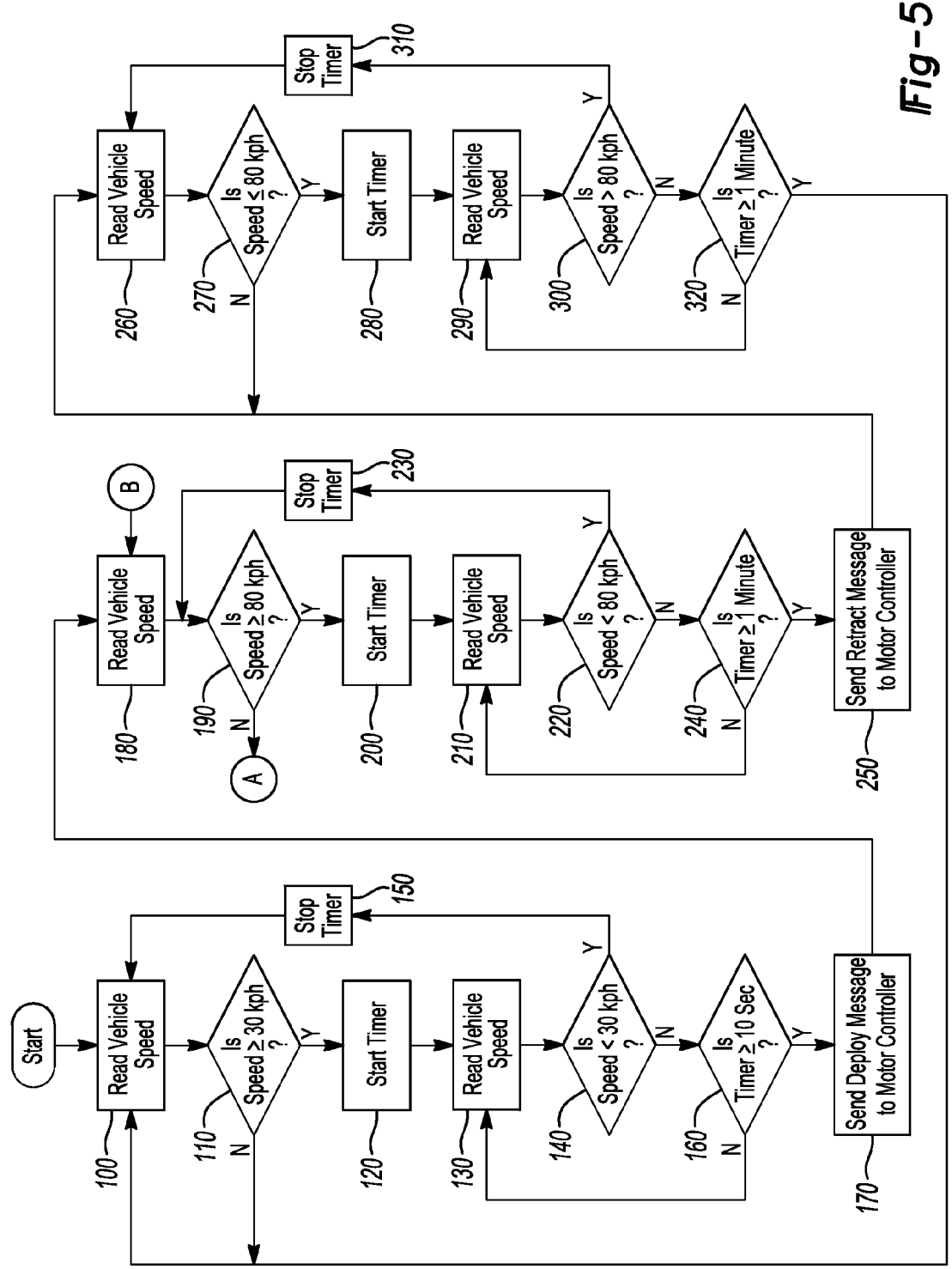
FIGS. 5 and 6 show, in the form of a flow-chart, an example of a deployment logic for a leg stiffener system that considers vehicle steering and braking in addition to vehicle speed.
Figure 6:
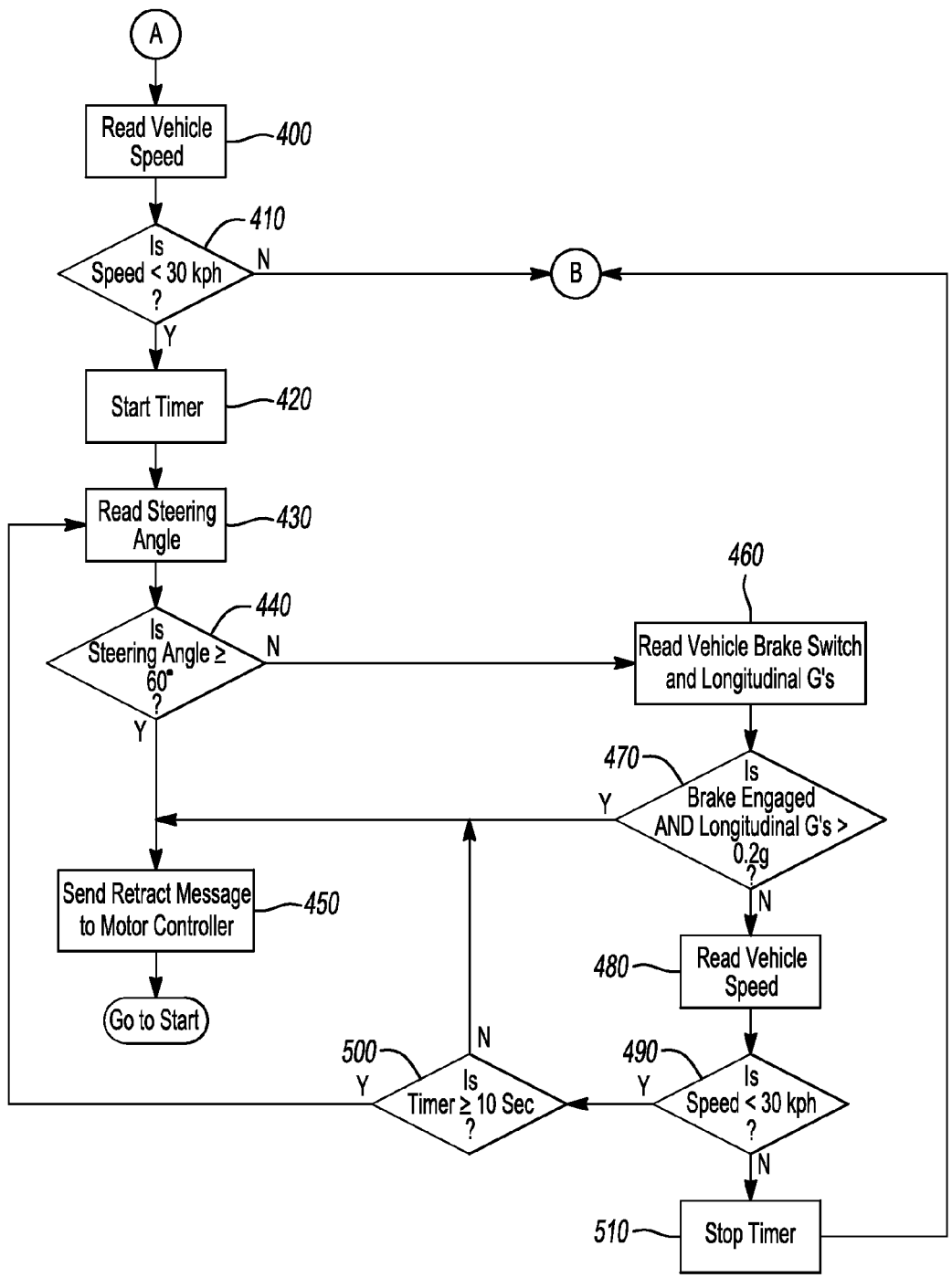

FIGS. 5 and 6 illustrate, in flow-chart form, an example of a stiffener deployment logic that additionally takes into account vehicle steering and braking conditions. At START in FIG. 5, the stiffener is in the retracted position and an Off-Road mode (which suppresses stiffener deployment, as described above) is not selected. At step 100 the vehicle speed read and is compared at step 120 with a lower limit speed, 30 kph in this example. If the speed is below this lower limit speed (step 110, NO), the logic returns to step 100 and the stiffener is maintained in the retracted position. If the speed is equal to or over 30 kph (step 110, YES), a timer is started at step 120 and the method progresses to step 130 where the vehicle speed continues to be read (or monitored) and compared with the lower limit speed at step 140.

If the vehicle speed check at step 140 finds the speed has dropped below 30 kph (YES), the timer is stopped (step 150) and the method returns to step 100. If the speed remains above 30 kph (step 140, NO), the method loops through steps 130, 140 160 until the timer exceeds a predetermined time (10 sec in the present example), and the method progresses to step 170 where the stiffener is deployed.

Vehicle speed continues to be read at step 180 and compared with an upper limit speed (80 kph in the present example) at step 190. If the upper limit is exceeded (step 190, YES), the combination of steps 190 through 240 result in the stiffener being maintained in the deployed position until the upper speed limit it exceeded for at least a predetermined length of time (1 min in this example. If the time limit is exceeded (step 240, YES), the method reached step 250 where the stiffener is retracted.

After the stiffener is retracted, vehicle speed continues to be monitored (260) and compared with the upper limit (270). Steps 260 through 320 combine to keep the stiffener retracted unless and until the vehicle speed drops below 80 kph (or other selected upper limit speed) continuously for over 1 min (or other predetermined time), step 320, YES. The method then returns to step 100 and, running the steps 10 thorough 160, the stiffener is deployed after an additional 10 sec if the vehicle speed remains above 30 kph for the designated time period (step 160, YES).

The timer setting in the logic shown in FIG. 5 (steps 160, 240 and 320) and their respective speed thresholds prevent unwanted, frequent cycling between the retracted and deployed stiffener positions that may otherwise occur if the vehicle is frequently crossing the selected lower or upper speed limit. It should be noted that by using a longer time threshold to retract the stiffener than is required to deploy it (1 min in step 240 versus 10 sec in step 160, in the present example), the system is biased towards keeping the stiffener deployed and thereby providing protection for the pedestrian.

Returning now to FIG. 5, step 190, if (after the stiffener is deployed at step 170) the vehicle speed remains below 80 kph (step 190, NO), the method progresses to step 400 (see FIG. 6). If the speed again drops below 30 kph (step 410, YES), a time is started (step 420) and if the timer reaches 10 sec (step 500, YES), the stiffener is retracted at step 450. This timer delay, as explained above with regards to FIG. 5, prevents undesirable cycling of the stiffener if the vehicle speed varies frequently above and below 30 kph. While this timer delay runs, however, the remaining steps shown in FIG. 6 will reach step 450 and retract the stiffener in two cases.

At steps 430, 440, the steering angle is read (measured) and compared with a limit angle (60° in the present example). If the steering angle equals or exceeds the limit angle, indicating a sharp turn, the stiffener is retracted to avoid possible damage.

At step 460, the vehicle's brake system status and longitudinal acceleration are read (monitored). If the vehicle brake is applied AND the longitudinal vehicle acceleration exceeds a limit acceleration (0.2g in the present example), indicating an abrupt braking maneuver, the stiffener is retracted to avoid possible damage.

Taken as a whole, the logic disclosed in FIGS. 5 and 6 is effective to deploy the stiffener when it is likely to be effective in reducing the likelihood and/or severity of pedestrian injuries, but retract the stiffener when it is unlikely to be effective and may unnecessarily reduce ground clearance. Further, this is accomplished without excessive cycling of the deployment mechanism FIG. 7 shows, in schematic block diagram form, an example of an apparatus capable of controlling the stiffener position in accordance with the logic described above in relation to FIGS. 5 and 6. In this example, numerous vehicle performance and control inputs are communicated to a pedestrian safety controller 62 via, for example, an electronic data bus such as a communication area network or CAN bus 65. The pedestrian safety controller 62 is preferably a microprocessor-based device that receives necessary inputs and applies appropriate programmed logic to direct the position of a pedestrian leg stiffener by controlling actuators such as, for example, the linear actuators 24, 26 discussed in relation to FIGS. 1-4.

Among the inputs received by pedestrian safety controller 62 are: speed data from a vehicle speed sensor 60; steering angle data from the vehicle steering system 74; brake activation data from a vehicle braking system 70; vehicle acceleration data from an accelerometer 76 (such as an inertial measurement unit (IMU), for example); and elapsed time information from a timer 78. Brake activation data from vehicle braking system 70 may be a binary "brake activated/not activated" signal from an electrical switch, or it may indicate a degree of braking applied.

An On/Off-Road Selector Switch 64 may be used to allow the driver to inhibit stiffener deployment, as described above. Other vehicle systems such as stability control module 66, powertrain 68, braking system 70, and adjustable suspension system 72 may also be adjusted in accordance with the On/Off-Road Selector Switch position and/or additional inputs, as is well known in the art.

The stiffener control method(s) and system block diagram disclosed in relation to FIGS. 5-7 are not limited to the stiffener actuation apparatus of FIGS. 1-4, but rather may be applied to any deployable pedestrian protection leg stiffener apparatus.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling operation of a pedestrian protection stiffener of a motor vehicle comprising:
retracting the stiffener from a deployed position if a vehicle brake is applied and a longitudinal acceleration of the vehicle simultaneously exceeds a limit acceleration.

2. The method of claim 1 further comprising:
retracting the stiffener from the deployed position if a measured speed of the vehicle drops below a lower limit.

3. The method of claim 2 wherein the stiffener is retracted only if the measured speed of the vehicle drops below the lower limit for longer than a predetermined length of time.

4. The method of claim 1 further comprising:
before the retracting step, moving the stiffener to the deployed position when a measured speed of the vehicle rises above an upper limit.

5. The method of claim 1 wherein the stiffener has a retracted position rearward of a forward surface of a vehicle bumper beam and above a ground clearance plane of the vehicle, and in the deployed position the stiffener is forward of the retracted position and below the ground clearance plane.

6. A method for controlling a pedestrian protection stiffener of a motor vehicle comprising:
deploying the stiffener if a vehicle speed exceeds a first value;
retracting the stiffener if the vehicle speed drops below a second value; and
retracting the stiffener if a vehicle brake is applied and a longitudinal vehicle acceleration simultaneously exceeds a limit acceleration.

7. The method of claim 6 wherein the first value is equal to the second value.

8. The method of claim 6 further comprising:
retracting the stiffener if the vehicle speed rises above a third value greater than the first value.

9. Apparatus comprising:
a pedestrian leg stiffener movably mounted to a motor vehicle;
an actuator moving the stiffener between a retracted position and a deployed position; and
a controller receiving an input from a braking system of the vehicle and an input from an accelerometer and directing the actuator to position the stiffener in the retracted position if the braking system input indicates a vehicle brake is applied and the accelerometer input simultaneously indicates that the vehicle is experiencing a longitudinal acceleration above a limit acceleration.

10. The apparatus of claim 9 wherein:
the controller further receives an input from a vehicle speed sensor and directs the actuator to position the stiffener in the retracted position if the speed sensor input indicates that a vehicle speed is below a lower limit.

11. The apparatus of claim 10 wherein the controller directs the actuator to position the stiffener in the retracted position only if the vehicle speed is below the lower limit for longer than a predetermined length of time.

12. The apparatus of claim 9 wherein:
the controller further receives an input from a vehicle speed sensor and directs the actuator to position the stiffener in the deployed position if the speed sensor input indicates that a vehicle speed exceeds an upper limit.

13. The apparatus of claim 9 wherein the stiffener in the retracted position is rearward of a forward surface of a vehicle bumper beam and above a ground clearance plane of the vehicle, and in the deployed position the stiffener is forward of the retracted position and below the ground clearance plane.

* * * * *